UNITED STATES PATENT OFFICE.

WALTER H. THEW, OF LIVERPOOL, COUNTY OF LANCASTER, ENGLAND.

CONDENSING PEPTONIZED MILK.

SPECIFICATION forming part of Letters Patent No. 324,048, dated August 11, 1885.

Application filed August 20, 1884. (No specimens.) Patented in England January 12, 1884, No. 1,313.

*To all whom it may concern:*

Be it known that I, WALTER HENRY THEW, a subject of the Queen of Great Britain, residing at Liverpool, in the county of Lancaster, in the Kingdom of England, have invented certain new and useful Improvements in the Process of Manufacturing Peptonized Milk, (for which Letters Patent have been granted to me in England, dated January 12, 1884, No. 1,313,) of which the following is a specification.

The use of milk in which the proteids have been rendered more easy of digestion by being converted in part at least into the bodies called "peptones," has of late been recommended by the medical profession, and has been employed with signal advantage in cases of disease and in the feeding of infants. Hitherto such peptonized milk has been prepared immediately or shortly before use by adding to the somewhat diluted and warmed milk a solution of the pancreatic ferments such as are now sold for this purpose, and allowing the process to go on according to the directions affixed to or accompanying the preparation.

I believe that hitherto peptonized milk has never been condensed and subjected to processes whereby it may either (a) be preserved indefinitely, or (b) condensed to such a degree as will allow of its being kept for a less period of time, or (c) prepared so that the condensed peptonized milk has an approximately constant composition such as is most favorable for the purpose of feeding infants. When milk is peptonized by this method, it acquires a bitter taste, which, if pronounced, is exceedingly distasteful to many patients. Completely peptonized milk prepared in the usual way is indeed so repulsive that no one would think of administering it by the mouth; but besides the bitter taste, ordinary peptonized milk possesses a property which has much tended to render it unpopular. Very shortly after it has been prepared the butter separates out and floats in oily drops on the surface of the yellowish liquid, which in consequence has lost the characteristic and tempting appearance presented by ordinary milk. Ordinary peptonized milk has a yellowish tint and has lost the characteristic opaque white appearance of natural milk. This feature of the preparation added to the before-mentioned separation of the butter-fats in drops renders it distasteful to most persons, and especially to invalids. Now, I have found that the bitter principle of peptonized milk can, by prolonged heating, be in some measure eliminated so as to leave the milk not distasteful, also that while the butter rapidly separates from ordinary peptonized milk, so that it has to be consumed immediately after it is prepared, the butter of the milk prepared by my process does not separate in this way. I have further found that by using phosphate of soda instead of bicarbonate of soda—the salt at present used in peptonizing—the light color of the milk is retained intact and a more wholesome article manufactured. Lastly, I have found much difficulty in boiling or condensing peptonized milk, owing to the great liability to boil over. I therefore use for this purpose deeper vacuum-pans than those ordinarily employed for condensing milk. By this means this trouble is avoided.

In carrying out my invention, I subject the milk in the first place to a preliminary process of digestion, by the aid of solutions containing the active principles of the pancreas. I then raise the temperature of the milk to boiling point, so as to destroy the activity of the pancreatic ferments, and after the addition of sugar condense the milk at a low temperature *in vacuo*.

The peptonized milk, in the event of its being desired to preserve it indefinitely, is before or during condensation treated with cane-sugar, as is customary in the preparation of sweetened condensed milk, or with maltose or other sugar, or, if desired, it is sterilized and preserved by being subjected, after concentration and sealing in tins for a sufficient time, to a temperature above 110° centigrade.

When it is not required to preserve the condensed peptonized milk indefinitely, I prefer not to add to it considerable quantities of sugar, but usually add small quantities of cane or milk sugar.

The following is the process which I adopt in the essential part of the operation: The milk is heated, in an open pan provided with rotary stirrers to a temperature varying between 40° and 65° centigrade, though I prefer a temperature varying between 55° and 60° centigrade. The stirrers keep the milk in a state of continued motion. Either before being raised to this temperature or after, it is mixed with one-third or one-fourth of its volume of water, and the temperature of the mixture raised, as above mentioned. I add to the warm diluted milk phosphate of soda ($Na_2HPO_4 12H_2O$) in the proportion of from half an ounce to one ounce to the gallon of the milk employed. The object of this addition is to neutralize any acid present in the milk (an acid reaction injuring the action) and to add a very valuable constituent to the milk, while at the same time preserving its color, also to prevent the coagulation of any unpeptonized casein when the milk is subsequently heated. Other alkaline phosphates, bicarbonates, carbonates, and even hydrates, might be employed for some of these purposes, but some of these are unwholesome, and none are nearly so desirable as the above salt. After the addition of phosphate of soda, I add an active extract of pancreas, preferring a solution made either by the aid of water, or spirit and water, or glycerine from the pancreas, taking care that the strength of the solution is such that when a small quantity—say two ounces to the gallon of milk—is added to the warm milk it will lead to the production of a slightly but perceptible bitter taste in a period varying between fifteen and thirty minutes, preferably in twenty minutes. The production of a distinct bitter taste indicates that a portion of the casein and other proteids of the milk is peptonized. I then heat the peptonized milk to a temperature sufficient to destroy the added pancreatic ferments and any living germs of any kind which may be present in it. Usually I boil the peptonized milk for ten or fifteen minutes, and then, having added to the hot milk the proportion of sugar which I consider desirable, subject it to the process of concentration, which is best carried out in a vacuum-pan. The degree to which the process of peptonizing is carried may be varied. When it is desired that nearly the whole of the proteids of milk shall be converted into peptones, the process is allowed to go on before the ferment is destroyed, until such time as acetic acid produces either no precipitate in a small sample of the liquid, or but a very slight precipitate.

Partially peptonized cow's milk is of special use in the feeding of infants, as in addition to the fully-digested proteid (peptone) present, the casein which has not been peptonized is in a condition which resembles very closely that in woman's milk.

I prepare a condensed peptonized milk for infants' use by the following process: The milk employed is of a composition known by previous analysis. I then treat it with one-third of its volume of water, and peptonize it as has been already described. I then add to it a quantity of cream sufficient to raise the amount of butter to 3.0 or 3.5 per cent. of the mixture, and I then heat to about 90° centigrade for ten minutes. I then add milk or other sugar, but preferably the sugar obtained by the prolonged action of pancreatic extract upon pure starches, in such proportion as to raise the amount of sugar to between five and six per cent., and slowly evaporate the product until it contains not more than fifty per cent. of water. This condensed product, which will, if required, keep for some days at a cool temperature, must be diluted before using, so as to have the same volume as the original milk after it had been diluted with one-third its volume of water. It may, if desired, be sterilized and thus preserved by exposure to heat in the way previously described.

I am well aware that condensed milk has for long been known, and that peptonized milk is also known as a preparation to be prepared as it is wanted for use, but I do not believe that a condensed, well-peptonized, yet palatable milk has ever before been prepared in such a way that on dilution with the requisite amount of water for use the milk presents the characteristic opaque white appearance of ordinary milk on which the butter-fat does not rise in oily masses, or that such milk has ever before been conveniently packed and preserved for an indefinite period.

I do not herein claim anything claimed by me in another application, filed November 12, 1884, Serial No. 147,760.

I claim as my invention—

1. The process of manufacturing peptonized milk, which consists in heating the milk to about 55° centigrade, then adding pancreatic liquid in substantially the proportions stated, then heating sufficiently to destroy the ferment when the required amount of conversion into peptones has been effected, and then condensing the product, substantially as described.

2. The process of manufacturing peptonized milk, which consists in heating the milk to about 55° centigrade, then adding phosphate of soda and pancreatic liquid in substantially the proportions herein specified, then heating sufficiently to destroy the ferment when the required amount of conversion into peptones has been effected, and then condensing the product, substantially as described.

3. The process of manufacturing peptonized milk, which consists in heating the milk to about 55° centigrade, then adding pancreatic liquid in substantially the proportions stated, then heating sufficiently to destroy the ferment when the required amount of conversion into peptones has been effected, maintaining a continual motion of the milk during such conversion, and then condensing the product.

In testimony whereof I have signed my name to this specification in the presence of two subscribing witnesses.

WALTER H. THEW.

Witnesses:
W. P. THOMPSON,
I. OWDEN O'BRIEN.